United States Patent [19]

Schwab et al.

[11] Patent Number: 5,200,222
[45] Date of Patent: Apr. 6, 1993

[54] MICROWAVE TOASTING OF PUFFED R-T-E CEREALS

[75] Inventors: Edward C. Schwab, New Brighton; George E. Brown, Edina, both of Minn.

[73] Assignee: General Mills, Inc., Minneapolis, Minn.

[21] Appl. No.: 899,576

[22] Filed: Jun. 18, 1992

Related U.S. Application Data

[63] Continuation of Ser. No. 750,786, Aug. 27, 1991, abandoned, which is a continuation-in-part of Ser. No. 726,591, Jul. 8, 1991, abandoned.

[51] Int. Cl.$^5$ .................. A23L 1/00; A21D 15/00
[52] U.S. Cl. .................. 426/241; 426/242; 426/620; 426/621; 426/808
[58] Field of Search ............ 426/241, 242, 620, 621, 426/622, 808

[56] References Cited

U.S. PATENT DOCUMENTS

| | | | |
|---|---|---|---|
| 3,620,764 | 11/1971 | Watkins | 426/241 |
| 3,682,651 | 8/1972 | McAlister | 426/242 |
| 3,904,429 | 9/1975 | Eastman et al. | 426/242 |
| 3,908,029 | 9/1975 | Fredrickson | 426/242 |
| 4,251,551 | 2/1981 | Van Hulle et al. | 426/242 |
| 4,342,788 | 8/1982 | Clatfelter | 426/243 |
| 4,409,250 | 10/1983 | Van Hulle et al. | 426/242 |
| 4,413,018 | 11/1983 | Webster | 426/618 |
| 4,608,261 | 8/1986 | MacKenzie | 426/242 |
| 4,650,681 | 3/1987 | Greethead | 426/622 |
| 4,800,090 | 1/1989 | August | 426/243 |
| 4,803,090 | 2/1989 | Schlipalius et al. | 426/242 |
| 4,808,782 | 2/1989 | Nakagawa et al. | 426/241 |
| 4,950,492 | 8/1990 | Shachat et al. | 426/808 |
| 4,988,521 | 1/1991 | Fan | 426/621 |
| 5,102,679 | 4/1992 | Whalen | 426/242 |

FOREIGN PATENT DOCUMENTS

| | | |
|---|---|---|
| 0072878 | 3/1983 | European Pat. Off. |
| 0312363 | 4/1989 | European Pat. Off. |
| 0375006 | 6/1990 | European Pat. Off. |
| 2055285 | 3/1981 | United Kingdom |
| 2193619A | 2/1988 | United Kingdom |

OTHER PUBLICATIONS

"Snack, crackle pop!" Food Manufacture, Mar., 1990 pp. 37-38.

Primary Examiner—George Yeung
Attorney, Agent, or Firm—John A. O'Toole

[57] ABSTRACT

Methods for toasting a puffed ready-to-eat cereal base are provided to increase the toasted flavor thereof. The methods comprise the step of subjecting the cereal base to a brief exposure to a high intensity (>125 V/cm) microwave field for about 5 to 45 seconds. The microwave toasted cereal pieces exhibit superior flavor resulting from "interior" toasting of the cereal base.

79 Claims, No Drawings

MICROWAVE TOASTING OF PUFFED R-T-E CEREALS

CROSS REFERENCE TO RELATED APPLICATION

This is a continuation of U.S. patent application Ser. No. 750,786, filed Aug. 27, 1991, now abandoned, which is a continuation-in-part application to our previous commonly assigned copending application, U.S. Ser. No. 726,591, entitled Stability Improvement of Oat R-T-E Cereals by High Intensity Microwave Heating (filed Jul. 8, 1991), now abandoned.

FIELD OF THE INVENTION

The present invention relates to food products and to methods for their preparation. More particularly, the present invention relates to puffed ready-to-eat breakfast cereals and to their methods of preparation.

BACKGROUND

Ready-to-eat ("R-T-E") breakfast cereals are popular packaged food items. R-T-E cereals exist in large numbers of varieties including puffed and unpuffed, natural or presweetened, and including a wide variety of cereal compositions.

One problem in cereal processing resides in flavor development. Many consumers prefer puffed cereals, and particularly R-T-E cereal in complex shapes such as torroids or rings or other shapes such as stars. The term "complex shapes" is used herein in reference to or equivalently with non-convex shapes. Such complexly shaped puffed cereals are generally prepared by gun puffing moist (e.g., 10% to 14% moisture) cereal pellets. While popular, many consumers enjoy the flavor of toasted cereals. Unfortunately, it is difficult to evenly toast puffed R-T-E cereals, especially those cereal pieces having a complex shape using conventional toasting equipment and methods. Generally, such known toasting techniques involve intense heating including radiant and/or conduction heating which involve heat transfer from the exterior of the piece inward. Due to the low density of puffed pieces which insulatively resists conductive heat transfer and due to complex shapes, undesirable scorching of the exterior surface can occur prior to the development of desirable toasted flavor by any significant weight of the interior of the cereal piece.

The operation of the gun puffing apparatus can be adjusted to provide some degree of toasting to the resulting puffed cereal pieces. Primarily, the adjustment involves retaining the pellets within the cereal gun for longer residence times so as to increase the pellets' exposure to the elevated temperature and pressure conditions within the gun. While effective to some degree, increasing the residence time of the pellets within the gun necessarily unfortunately decreases the throughput of pellets through the gun. Since cereal puffing guns are complex and capital and energy intensive manufacturing equipment, even modest reductions in capacity or throughput can materially increase production costs.

In view of the state of the art, there is a continuing need for improvements in the cereal processing art for preparing R-T-E cereals exhibiting increased stability.

Accordingly, it is an object of the present invention to provide improved cereal processing methods for the production of R-T-E cereals which exhibit increases in shelf stability.

Still another object of the present invention is to provide methods for cereal processing which can be readily practiced in present commercial cereal processing plants without requiring extensive modification of existing cereal processing processes or equipment.

Another object of the present invention is to provide cereal processing method improvements which can reduce the cost of cereal processing by reducing plant start-up time.

Another object of the present invention is to provide cereal processing methods which can provide improvements in product stability so as to allow the reduction or elimination of addition of stabilizers to cereal compositions.

Another object of the present invention is to provide interior toasting of puffed R-T-E cereal pieces.

Still another object of the present invention is to provide interior toasting of complexly shaped puffed R-T-E cereal pieces.

Surprisingly, the above objects can be realized and the present invention provides methods for dramatically increasing the flavor and stability of puffed R-T-E cereals. The present invention involves subjecting the finished puffed R-T-E cereal or a cereal base to a brief exposure to a high intensity microwave field. For sugar coated embodiments, the cereal base can be microwave heated prior to the application of the topical coating. In its product aspect, the present invention resides in finished products exhibiting enhanced shelf stability.

SUMMARY OF THE INVENTION

In its method aspect, the present invention resides in methods of toasting R-T-E cereal products with high intensity microwave fields to provide products exhibiting improved flavor and stability. The methods comprise the step of subjecting the R-T-E cereal or cereal base to a brief exposure to a high intensity (>125 V/cm) microwave field for about 5 to 45 seconds. The treated cereal pieces exhibit superior improved flavor resulting from "interior" toasting of the cereal base and also stability.

The present invention is an improvement over our prior invention in the realization that the benefits of high intensity microwave heating can be used to interiorly toast and tenderize puffed R-T-E cereal product for flavor and texture improvement of a wide variety of cooked cereal doughs, not just those comprising cereal oils to impart improved oil stability.

In its product aspect, the present invention provides R-T-E cereals, especially puffed, exhibiting improved flavor development and greater flavor stability essentially characterized by an inverse toasting gradient.

DETAILED DESCRIPTION OF THE INVENTION

The present invention provides improved R-T-E cereals and improved cereal processing methods for preparing such improved puffed R-T-E cereals. The present methods involve subjecting a puffed R-T-E cereal base to a brief exposure to a high intensity microwave field. The methods of the present invention are described in detail below.

Throughout the specification and claims, percentages are by weight and temperatures in degrees Fahrenheit unless otherwise indicated.

A. Providing A Puffed Cereal Base

The present methods involve treating a puffed R-T-E cereal base. The cereal base comprises a plurality of individual pieces of finished puffed R-T-E cereal compositions.

The cereal base can comprise a wide variety of shapes, densities, sizes and compositions. The term "puffed cereal pieces" is used herein in its conventional usage to refer to relatively larger, low density base pieces having a density ranging from about 0.06 to 0.14 g/cc (4.3 to 10 oz per 124 in$^3$) preferably about 0.09 to 0.14 g/cc.

In the conventional preparation of an R-T-E cereal, a dry blend of starchy cereal ingredients with or without a bran or fiber constituent is well mixed and then combined with water and mixing with heat to cook or gelatinize the starchy component of the cereal composition. The gelatinized or cooked cereal upon further mixing forms a cooked farinaceous dough. A variety of well known cooking methods and equipment can be used to prepare a cooked cereal dough. For example, the wetted cereal blend can be processed in a cooker extruder or in a pressurized and agitated steam cooker each of which form a cooked cereal dough which in turn is fed to a cereal pellet forming extruder. In another embodiment, the cooking and dough forming steps are performed simultaneously in a high pressure, cooker extruder equipped with a pellet-forming diehead. The cooked cereal dough pellets so formed typically range from about 18% to 30% moisture. The pellets can then be dried and tempered to adjust the moisture content for further processing.

For example, pellets having a moisture content of about 10% to 14% can be fed to a conventional puffing gun to form a puffed R-T-E cereal base. The puffed base cereal pieces exit the puffing gun at a moisture content of about 6%. In the production of regular, i.e., not presweetened by the application of a sugar coating, the puffed pieces in conventional methods of preparation are then dried to a final moisture content of about 3%. In the production of presweetened as well as flavored or bit coated, the puffed pieces are charged directly to an enrober at their exiting 6% moisture content and are then tumbled and dried and thus coated with the topical coating materials. As part of the coating operation, the moisture content is reduced to the required 3% levels.

In still other embodiments, the puffed pieces are prepared without an intermediate pellet forming step by direct expansion at the diehead of a cooker extruder, e.g., a twin screw cooker extruder.

In certain highly preferred embodiments of the present invention, the R-T-E pieces additionally include a flavor coating such as a presweetening coating. Well known compositions and presweetener coating application techniques can be employed both for sugar coating or when using various high potency sweeteners, e.g., aspartame, acetylsulfame K. In more preferred embodiments, the presweetening coating comprises, optionally, sugar coating solution additionally comprising a flavor constituent and/or vitamins. The addition of a flavor constituent to the sugar coating solution is preferred due to flavor losses that can occur from the frying, toasting or puffing steps practiced herein. These steps, due to their heat application, tend to drive off the volatile flavor constituents leading to flavor degradation or loss. The certain other preferred embodiment's coating can also include particulates such as fruit and nut pieces and/or small cereal grain flakes. The coating step can be practiced to evenly coat the exterior of the cereal base or to be selectively deposited in recesses in known manner. (See, for example, U.S. Pat. No. 4,539,211 entitled Process for Manufacturing Cavity-Filled Cereal Pieces, issued Sep. 3, 1985 to Armando et al. which is incorporated herein by reference.)

Of course, within this general outline of cereal processing, a wide variety of particular methods and variations can be used. In the production of an R-T-E cereal, various general procedures are used depending upon the desired form, type or condition of the final product.

The present invention is particularly suitable for use in connection with a corn based, puffed R-T-E cereal. In this preferred embodiment, the puffed cereal base is fabricated from a gelatinized cereal composition having the following formulation:

| Ingredient | Weight % |
|---|---|
| Corn flour | 40 to 90%, preferably about 75 to 85% |
| Salt | 0.1 to 2.5% preferably about 1 to 2.5% |
| Wheat starch | 0.1 to 20% preferably about 2.5 to 7.5% |
| Supplemental flour | 0.1 to 40% preferably about 0.5 to 15% |
| Sugar(s) | 0.1 to 10% preferably about 0.3 to 7% |

The methods of finish toasting by high intensity microwave heating can also be combined with the high intensity microwave cereal pellet tempering methods disclosed in commonly assigned U.S. Ser. No. (filed Aug. , 1991) entitled "Microwave Tempering of Cooked Cereal Pieces" (Attorney Docket 4676) which is incorporated herein by reference.

B. Exposing the Cereal Base to a High Intensity Microwave Field

The present methods essentially comprise the step of subjecting the finished puffed cereal or cereal base to a high intensity microwave field. In the present invention, a high intensity microwave heating step is substituted for the conventional post-puffing drying step.

In the present invention it is essential that the cereal base must have sufficient amounts of components which readily heat upon exposure to a microwave field such as moisture, salt, fat and sugar. While the precise level of such ingredients can vary, in preferred embodiments, the cereal bases contain moisture levels which permit heating but without further puffing. Preferably, the moisture content ranges between about 3% to 8% prior to microwave heating. The cereal base prior to microwave heating desirably has a moisture content adjusted to about 3% to 12%, preferably about 4% to 7%. As a result of the microwave heating step, the moisture content is reduced to about 1% to 6% to obtain a finished moisture content. Insufficient moisture prior to microwave heating can result in a finished product exhibiting reduced component stability.

Commercial cereal production is generally continuous and the puffed cereal pieces can be fed while still warm to the microwave unit for microwave toasting. In batch processing where the pellets are allowed to cool prior to microwaving, the microwave heating step is continued slightly longer within the below given duration ranges.

Surprisingly, the microwave heating treatment gives a toasting quality to the product. Importantly, the toasting is from the inside of the cereal piece outward rather than being outward to inward as would be obtained by toasting in a conventional toasting oven. Such a toasting is important to providing a more enhanced toasted cereal taste without causing a burnt flavor to develop.

For those embodiments to be topically coated, the simplest and preferred variation is to microwave treat the cereal base prior to the application of the sugar coating. In a less preferred embodiment, the coated product can be microwave treated, preferably at a slightly higher moisture content than the desired finished moisture content. In still another variation for preparing a sugar coated puffed cereal, puffed pieces coated with a sugar slurry or syrup while still wet are high intensity microwave heated to both dry and interiorly toast the cereal. Such an embodiment can thus eliminate the conventional forced hot air drying step.

Importantly, the present high intensity microwave exposure step is to be distinguished from heating of the cereal base pieces in a conventional microwave oven. A conventional microwave oven is characterized by a relatively low and highly uneven field intensity. Microwave field intensity or, more precisely, energy dissipation density can be described, of course, in various ways. In the present invention, the microwave field intensity is described in a conventional manner as a voltage gradient in the free space in the microwave, e.g., volts/cm ("V/cm"). For comparison, this field strength is about 3 to 10 times greater than achieved in a conventional consumer microwave oven. Such high microwave field intensity can in turn involve high power dissipation in the product (>100 w/g). In contrast, in a conventional microwave oven, as the unit's rated power increases, generally the unit's cavity size also increases so that the field strength remains relatively constant. This field strength feature is important not only so that the operating/cooking performance remains relatively uniform regardless of cavity size but also to provide premature burn-out of the magnetron by reverse channeling or microwave reflection through the wave guide.

In the present invention, the cereal base pieces are desirably subjected to a microwave field ranging greater than 125 V/cm or between about 3 to 10 times (3X-10X) conventional microwave field intensity. For preferred embodiments, the field strength desirably ranges from about 50-350 V/cm, and for best results about 250-300. Also, it is preferred to use higher microwave frequencies. Thus, between the two licensed MW frequencies permitted at present, a 2450 MHz frequency is preferred to 915 MHz. Higher frequencies importantly give more uniformity in field strength which in turn can result in greater uniformity in the finished product.

Surprisingly, when finished cereal base pieces are subjected to lower intensity and/or uneven microwave fields such as are characteristic of consumer microwave ovens, the stability and flavor development benefits are not obtained. Cereal base pieces even when microwave heated in low quantities for extended times merely result in finished products undesirably exhibiting hardness and/or charring without the flavor and stability benefits provided herein. For reasons not understood, the pieces do not toast but quite suddenly transform from untoasted to burnt.

Measurement and/or calculation of field strength can be troublesome. Useful to measure such high intensity microwave field strength herein is a Microwave E-Field Probe or meter (Model No. MEF-1.5) available from Luxtron Corp. (Mountain View, Calif.).

Microwave equipment that can provide the desired field strength is commercially available. Useful herein for practicing the present methods are industrially sized microwave ovens from and, preferably APV Baker, Inc. (See GB 2,193,619A by R. J. Meredith and John Milton.) Minor modifications to the equipment may be required to adapt the equipment from a known application, e.g., rubber curing, to the sanitary standards that are conventional for food processing.

The exposure of the R-T-E cereal base to the high intensity microwave field is continued for sufficient time to impart to the base the desired flavor benefits taught herein. Of course, the particular exposure times will vary depending upon such factors as the degree of toasting preferred, the microwave performance characteristics of the equipment selected including the microwave field characteristics it develops, the microwave absorbing characteristics of the cereal base, the quantity of pieces being processed at any time, etc. However, good results generally are obtained when the puffed cereal pieces are exposed for times ranging from about 5 to 45 seconds at the high intensity field strengths herein. Better results in terms of toasting and stability improvements are obtained when exposure times range from about 20 to 45 seconds. For best results, exposure times desirably range from about 20 to 35 seconds. Generally, longer exposure times are selected when greater toasting is desired or with lower power densities. Conversely, when only enhanced stability is desired with little or no toasting, shorter exposure times can be employed and/or when the cereal pieces are treated immediately after puffing and while still warm or when employing higher power densities.

The present methods involving a post gun puffing microwave step can employ reduced gun residence times. The operation of the gun puffing apparatus can be adjusted to provide some degree of toasting to the resulting puffed cereal pieces. Primarily, the adjustment involves retaining the pellets within the cereal gun for longer residence times so as to increase the pellets' exposure to the elevated temperature and pressure conditions within the gun. While effective to some degree, increasing the residence time of the pellets within the gun necessarily unfortunately decreases the throughput of pellets through the gun. Thus, the present methods involving a post gun puffing microwave step can employ reduced gun residence times. The advantages provided herein by reducing gun residence times importantly lead in turn to important gains in cereal throughput and production from the capital intensive gun puffing production.

Still another advantage of the present invention is that the degree of toasting can be controlled quite closely. Furthermore, the toasting can be provided throughout the body of the cereal piece rather than merely the surface thereof which facilitates control of the degree of toasting.

Still another surprising advantage of the present invention is that the present methods allow for the even toasting of complexly shaped puffed R-T-E cereal pieces, i.e., all non-convex shaped puffed R-T-E cereal pieces. A "convex" shape is a mathematical definition of a two or three dimensional shape having the characteristic that a straight line drawn from any two interior points does not go outside the boundary of the shape. Examples of convex shapes include familiar geometric shapes such as spheres, cones, ellipsoids, (e.g., puffed wheat, rice) etc. Exemplary non-convex shapes include, for example, rings, stars, letters, figurines (e.g., animals, plants, planes, ships, people, cornucopias, etc)). When complex, i.e., "non-convex" shapes such as rings or stars are toasted by known toasting methods involving radiant or conductive heat, the recessed portions of the cereal pieces resist toasting development resulting in low homogeneity.

A very surprising advantage of the present invention is that the flavor and stability advantages of interior toasting can be provided without adversely affecting a light colored exterior, i.e., without darkening or toasting of the surface of the piece.

Puffed R-T-E cereal products that have been toasted by conventional toasting methods are characterized by a toasting gradient darkest at the surface and progressively lighter to the center of the product. In contrast, the present finished puffed and interiorly toasted cereal products are essentially characterized by an inverse toasting gradient. By "inverse toasting gradient" it is meant herein that the toasting/darkening is most intense in the puffed piece's interior progressively lessening to the product's exterior surface. This is a particular advantage to certain puffed R-T-E cereals which traditionally have had, and thus consumers have come to expect, a light or even off-white surface color.

After microwave toasting, the microwave treated pieces are allowed to cool to ambient temperature and then subsequently packaged and distributed in conventional manner.

Industrial Applicability

The present invention finds particular suitability for the commercial preparation of puffed ready-to-eat cereals.

Without further elaboration, it is believed that one skilled in the art can, using the preceding description, utilize the present invention to its fullest extent. The following preferred specific embodiments are, therefore, to be construed as merely illustrative and not limitative of the remainder of the disclosure. It will be appreciated that other modifications of the present invention, within the skill of the R-T-E cereal art, can be undertaken without departing from the spirit and scope of the invention.

EXAMPLE 1

To test the internal toasting imparted to a corn-based puffed R-T-E cereal by a high intensity microwave field, a sample of a product of the present invention was prepared. An unsweetened, puffed corn based R-T-E cereal composition in the shape of spheres (marketed under the brand name Kix) with a moisture content of about 6% was microwaved at a feed rate of 1 lb/min in a high intensity microwave unit (available from APV Baker at a rated power capacity of 13.5 kW). The unit has an adjustable power feature and 12 kW of microwave power was used and the residence time in the microwave chamber was 24 seconds. The field intensity during the microwave toasting was about 240 V/cm.

The samples were tasted by a group of people familiar with the taste characteristics of the product. All of the people found that the product had an enhanced toast note and corn flavor and that this was very positive for product quality. The interior toasting was imparted to the R-T-E cereal without significantly changing its light exterior color.

EXAMPLE 2

To test the internal toasting in an oat-based puffed R-T-E cereal by a high intensity microwave field, an experiment similar to Example 1 was run using an unsweetened puffed oat-based cereal in the shape of rings (marketed under the brand name Cheerios) with a moisture content of about 6%. A feed rate of 0.5 lb/min was used to the same unit with the adjustable power set at 9 kW and a residence time of 23 seconds in the microwave field. The field intensity during the microwave toasting was about 200 V/cm. The samples were tasted by a group of people familiar with the cereal and it was found that the treated sample had a pleasant, toasted note not present in the untreated control.

What is claimed is:

1. A method for interiorly toasting a puffed R-T-E cereal base to improve its flavor and texture, comprising the step of:
    subjecting a puffed R-T-E cereal base to a high intensity microwave field for a sufficient period of time long enough to toast the interior of the cereal base and shorter than to cause exterior scorching to provide an interiorly toasted R-T-E cereal base,
    wherein the microwave field has a field strength of about 125-350 V/cm.
2. The method of claim 1
    wherein the R-T-E cereal base has a moisture content of about 2% to 10% by weight.
3. The method of claim 2
    wherein the microwave heating step is continued for about 5 to 45 seconds.
4. The method of claim 3
    wherein the cereal base has a bulk density ranging from about 5.0 to 11 oz/124 in$^3$ (0.07 to 0.15 g/cc).
5. The method of claim 4
    wherein the puffed cereal base has a convex shape.
6. The method of claim 5
    wherein the cereal base comprises a corn based cereal base.
7. The method of claim 6
    wherein the cereal base comprises
    a) about 40 to 90 wt % of the cereal base of corn flour,
    b) about 0.1 to 40 wt % of supplemental flour,
    c) about 0.1 to 20 wt % of wheat starch.
8. The method of claim 7
    wherein the puffed cereal pieces comprise spherical pieces.
9. The method of claim 1 additionally comprising applying a topical coating to the cereal base.
10. The method of claim 9
    wherein the topical coating step follows the microwave step, and
    wherein the coating additionally comprises a sweetener.
11. The method of claim 10
    wherein the microwave field has a field strength of about 250 to 350 V/cm.
12. The method of claim 4
    wherein the puffed cereal base has a non-convex shape.
13. The method of claim 12 wherein the puffed cereal base shape is selected from the group consisting of rings, stars, letters, figurines, cornucopias, and mixtures thereof.

14. The method of claim 13 wherein the microwave field density is about 250-350 V/cm.

15. The method of claim 14 wherein the cereal base comprises puffed ring-shaped cereal pieces.

16. The method of claim 14 wherein the cereal base is in the form of a star.

17. The method of claim 14 additionally comprising the step of:
applying a topical sweetener coating to the microwave toasted R-T-E cereal base to form a pre-sweetened toasted R-T-E cereal.

18. The method of claim 5 wherein the cereal base comprises a puffed grain selected from the group consisting of puffed corn, puffed wheat, puffed rice and mixtures thereof.

19. The method of claim 8 wherein the cereal comprises
a) about 75 to 85 wt % of the cereal base of corn flour,
b) about 0.5 to 15 wt % of supplemental flour,
c) about 2.5 to 75 wt % of wheat starch,
d) about 1 to 2.5 wt % of salt, and
e) about 0.3 to 7 wt % of sugar.

20. The product prepared by the method of claim 1.
21. The product prepared by the method of claim 2.
22. The product prepared by the method of claim 3.
23. The product prepared by the method of claim 4.
24. The product prepared by the method of claim 5.
25. The product prepared by the method of claim 6.
26. The product prepared by the method of claim 7.
27. The product prepared by the method of claim 8.
28. The product prepared by the method of claim 9.
29. The product prepared by the method of claim 10.
30. The product prepared by the method of claim 11.
31. The product prepared by the method of claim 12.
32. The product prepared by the method of claim 13.
33. The product prepared by the method of claim 14.
34. The product prepared by the method of claim 15.
35. The product prepared by the method of claim 16.
36. The product prepared by the method of claim 17.
37. The product prepared by the method of claim 18.
38. The product prepared by the method of claim 19.

39. The method of claim 7 additionally comprising the step of
partially exteriorly toasting the cereal base by radiant heating prior to subjecting the cereal base to the microwave field.

40. The product prepared by the method of claim 39.

41. A method for preparing a puffed cereal piece exhibiting fewer interior voids and interior toasting comprising the steps of:
A. providing a quantity of cooked cereal pieces having a moisture content ranging from about 8% to 20% by weight;
B. microwave tempering the cooked cereal pieces in a high intensity microwave field having a field strength of greater than 125 V/cm for a time sufficient to evenly distribute the moisture without steam pressure generation within the piece to form a microwave tempered cereal pellet;
C. puffing the microwave tempered cereal pellets to form puffed cereal pieces; and
D. interiorly microwave toasting the puffed cereal pieces by subjecting the puffed cereal pieces to a high intensity microwave field having a field strength of greater than 125 V/cm for a time sufficiently long to interiorly toast, but shorter than to cause exterior scorching to form finished interiorly toasted cereal pieces.

42. The method of claim 41 wherein the R-T-E cereal base has a moisture content of about 2% to 10% by weight.

43. The method of claim 42 wherein the microwave heating step is continued for about 5 to 45 seconds.

44. The method of claim 43 wherein the cereal base has a bulk density ranging from about 5.0 to 11 oz/124 in$^3$ (0.07 to 0.15 g/cc).

45. The method of claim 44 wherein the puffed cereal base has a convex shape.

46. The method of claim 45 wherein the cereal base comprises a corn based cereal base.

47. The method of claim 46 wherein the cereal base comprises
a) about 40 to 90 wt % of the cereal base of corn flour,
b) about 0.1 to 40 wt % of supplemental flour,
c) about 0.1 to 20 wt % of wheat starch.

48. The method of claim 47 wherein the puffed cereal pieces comprise spherical pieces.

49. The method of claim 48 additionally comprising applying a topical coating to the cereal base.

50. The method of claim 49 wherein the topical coating step follows the microwave step, and
wherein the coating additionally comprises a sweetener.

51. The method of claim 50 wherein the microwave field has a field strength of about 250 to 350 V/cm.

52. The method of claim 44 wherein the puffed cereal base has a non-convex shape.

53. The method of claim 52 wherein the puffed cereal base shape is selected from the group consisting of rings, stars, letters, figurines, cornucopias, and mixtures thereof.

54. The method of claim 53 wherein the microwave field density is about 250-350 V/cm.

55. The product prepared by the method of claim 41.
56. The product prepared by the method of claim 42.
57. The product prepared by the method of claim 43.
58. The product prepared by the method of claim 44.
59. The product prepared by the method of claim 45.
60. The product prepared by the method of claim 46.
61. The product prepared by the method of claim 47.
62. The product prepared by the method of claim 48.
63. The product prepared by the method of claim 49.
64. The product prepared by the method of claim 50.
65. The product prepared by the method of claim 51.
66. The product prepared by the method of claim 52.
67. The product prepared by the method of claim 53.
68. The product prepared by the method of claim 54.

69. A puffed, R-T-E cereal having an exterior surface and
an interior body, the improvement, comprising:

an inverse toasting gradient being greatest in the center of the body.

70. The R-T-E cereal of claim 69 wherein the exterior surface is substantially untoasted.

71. The R-T-E cereal of claim 70 having a convex shape.

72. The R-T-E cereal of claim 71 having a spherical shape.

73. The R-T-E cereal of claim 72 wherein the cereal comprises a cooked farinaceous cereal dough including
a) about 40 to 90 wt % of the cereal base of corn flour,
b) about 0.1 to 40 wt % of supplemental flour,
c) about 0.1 to 20 wt % of wheat starch.

74. The R-T-E cereal of claim 73 wherein the exterior surface is white.

75. The R-T-E cereal of claim 70 having a non-convex shape.

76. The R-T-E cereal of claim 75 wherein the puffed cereal base shape is selected from the group consisting of rings, stars, letters, figurines and mixtures thereof.

77. The R-T-E cereal of claim 76 wherein the R-T-E cereal includes a topical pre-sweetener coating.

78. The R-T-E cereal of claim 77 wherein the R-T-E cereal has a density of about 0.05 to 0.15 g/cc.

79. The method of claim 9 wherein the topical coating step precedes the microwave step.

* * * * *